(12) United States Patent
Wei et al.

(10) Patent No.: US 11,979,764 B2
(45) Date of Patent: May 7, 2024

(54) INTER-INTEGRATED ACCESS AND BACKHAUL NODE CROSS-LINK INTERFACE MEASUREMENT AND REPORTING

(71) Applicant: Apple Inc., Cupertino, CA (US)

(72) Inventors: Lili Wei, Portland, OR (US); Qian Li, Beaverton, OR (US); Dawei Ying, Hillsboro, OR (US); Geng Wu, Portland, OR (US)

(73) Assignee: Apple Inc., Cupertino, CA (US)

( * ) Notice: Subject to any disclaimer, the term of this patent is extended or adjusted under 35 U.S.C. 154(b) by 428 days.

(21) Appl. No.: 17/267,573

(22) PCT Filed: Aug. 8, 2019

(86) PCT No.: PCT/US2019/045667
§ 371 (c)(1),
(2) Date: Feb. 10, 2021

(87) PCT Pub. No.: WO2020/033655
PCT Pub. Date: Feb. 13, 2020

(65) Prior Publication Data
US 2021/0321281 A1 Oct. 14, 2021

Related U.S. Application Data

(60) Provisional application No. 62/717,669, filed on Aug. 10, 2018.

(51) Int. Cl.
*H04W 24/10* (2009.01)
*H04B 17/336* (2015.01)
*H04W 88/14* (2009.01)

(52) U.S. Cl.
CPC .......... *H04W 24/10* (2013.01); *H04B 17/336* (2015.01); *H04W 88/14* (2013.01)

(58) Field of Classification Search
CPC .. H04B 17/327; H04B 17/336; H04B 17/345; H04W 24/10; H04W 84/047; H04W 88/14
See application file for complete search history.

(56) References Cited

U.S. PATENT DOCUMENTS

| 2013/0301450 A1 | 11/2013 | Geirhofer et al. |
| 2014/0036796 A1 | 2/2014 | Etemad et al. |

(Continued)

FOREIGN PATENT DOCUMENTS

| AU | 2015202327 A1 | 5/2015 |
| CN | 101651971 A | 2/2010 |

(Continued)

OTHER PUBLICATIONS

Nokia et al., "NR support for IAB", R1-1806660, 3GPP TSG RAN WG1 Meeting #93, Busan, Korea, May 12, 2018; 5 pages.

(Continued)

*Primary Examiner* — Kashif Siddiqui
(74) *Attorney, Agent, or Firm* — Sterne, Kessler, Goldstein & Fox P.L.L.C.

(57) ABSTRACT

Embodiments of the present disclosure describe methods and apparatuses for measurements and reports in integrated access and backhaul networks. An integrated access and backhaul (IAB) node is configured to: receive radio resource control (RRC) signaling from a IAB donor node, the RRC signaling to include configuration information with respect to reference signals of the IAB donor node or one or more neighboring IAB nodes; perform one or more measurements based on the reference signals of the donor node or the one or more neighboring IAB nodes; and transmit measurement report to the IAB donor node, the measurement report to include an indication of results of the one or more measurements.

20 Claims, 7 Drawing Sheets

(56) References Cited

U.S. PATENT DOCUMENTS

| | | | |
|---|---|---|---|
| 2015/0195757 A1 | 7/2015 | Tietz et al. | |
| 2017/0005913 A1 | 1/2017 | Hampel et al. | |
| 2017/0303144 A1* | 10/2017 | Guo | H04B 17/318 |
| 2018/0205427 A1* | 7/2018 | Ghosh | H04W 24/08 |
| 2019/0273600 A1* | 9/2019 | Wang | H04B 17/345 |
| 2020/0037185 A1* | 1/2020 | Ghosh | H04W 24/08 |
| 2020/0351690 A1* | 11/2020 | Zhu | H04B 17/336 |
| 2021/0153189 A1* | 5/2021 | Jo | H04B 7/15542 |
| 2021/0195674 A1* | 6/2021 | Park | H04W 24/04 |
| 2022/0124531 A1* | 4/2022 | Miao | H04B 17/345 |
| 2023/0318785 A1 | 10/2023 | Zhang et al. | |

FOREIGN PATENT DOCUMENTS

| | | |
|---|---|---|
| CN | 104428997 A | 3/2015 |
| CN | 104509162 A | 4/2015 |
| CN | 105978677 A | 9/2016 |
| CN | 107852363 A | 3/2018 |
| WO | WO 2020/056364 A1 | 3/2020 |

OTHER PUBLICATIONS

CMCC, "Discussio on UE-to-UE corss-link interference management", R1-1710784, 3GPP TSG RAN WG1 NR Ad-Hoc#2, Qingdao, P.R. China, Jun. 17, 2017; 3 pages.

Qualcomm Incorporated, "Enhancements to support NR backhauls links", R1-1807393, 3GPP TSG RAN WG1 Meeting # 93, Busan, Korea, May 12, 2018; 13 pages.

Nokia et al., "On Cross-link Interference Management in IAB", R1-1806665, 3GPP TSG RAN WG1 Meeting #93, R1-1806665, Busan, Korea, May 12, 2018; 3 pages.

International Search Report and Written Opinion of the International Searching Authority directed to related International Patent Application No. PCT/US2019/045667, dated Feb. 13, 2020, 9 pages.

Office Action and Search Report, dated Nov. 3, 2023, for Chinese Patent Appl. No. 201980052892.0, 17 pages including English translation of search report.

AT&T, "Overview of physical layer enhancements for IAB," 3GPP TSG RAN WG1 Meeting #92bis, R1-1804662, Sanya, China, Apr. 16-20, 2018, 7 pages.

Nokia, Nokia Shanghai Bell, "Enhancements to support NR backhaul links," 3GPP TSG RAN WG1 Meeting #92bis, R1-1804620, Sanya, P.R. China, Apr. 16-20, 2018, 5 pages.

Notice of Grant directed to related Chinese Application No. 201980052892.0, with English-language machine translation attached, issued Mar. 14, 2024; 10 pages.

* cited by examiner

INTER-INTEGRATED ACCESS AND BACKHAUL NODE CROSS-LINK INTERFACE MEASUREMENT AND REPORTING

RELATED APPLICATION

This application is a National Phase in the United States of PCT Application No. PCT/US2019/045667, filed on Aug. 8, 2019, which claims priority to U.S. Provisional Application No. 62/717,669 filed Aug. 10, 2018, each of which is incorporated herein by reference in its entirety.

FIELD

Embodiments of the present disclosure generally relate to the field of wireless communication, and more particularly, to apparatuses, systems, and methods for inter-integrated access and backhaul node cross-link interference measurement reporting.

BACKGROUND

Integrated access and backhaul (IAB) networks may include IAB nodes that may communicatively couple with one by over-the-air (OTA) backhaul links and may communicatively couple with user equipments (UEs) by OTA access links. The access and backhaul links may share the same wireless channel.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, numerals within the accompanying drawings designate like parts throughout. While the detailed description and figures describe specific embodiments, other embodiments within the scope of the present disclosure may include structural or logical changes. Embodiments describe various operations as multiple discrete actions or operations in turn, in a manner that is most helpful in understanding the claimed subject matter. However, the order of description does not imply that these operations are necessarily order dependent. In particular, these operations may performed in orders different from the order of presentation. Further, various additional operations may be performed or described operations may be omitted in additional embodiments. The description may use the phrases "in an embodiment," or "in embodiments," which may each refer to one or more of the same or different embodiments. The terms "comprising," "including," "having," and the like, as used with respect to embodiments of the present disclosure, are synonymous. For the purposes of the present disclosure, the phrases "A or B," "A and/or B," and "A/B" mean (A), (B), or (A and B).

In an IAB Network, both the backhaul and access link may suffer from inter-IAB-node cross-link interference (CLI). Embodiments herein provide measurement and reporting mechanisms at one or more IAB nodes to address inter-IAB-node CLI. In addition to describing the measurements and reporting with different level of details, embodiments introduce new RRC signaling/parameters.

Figure 1:
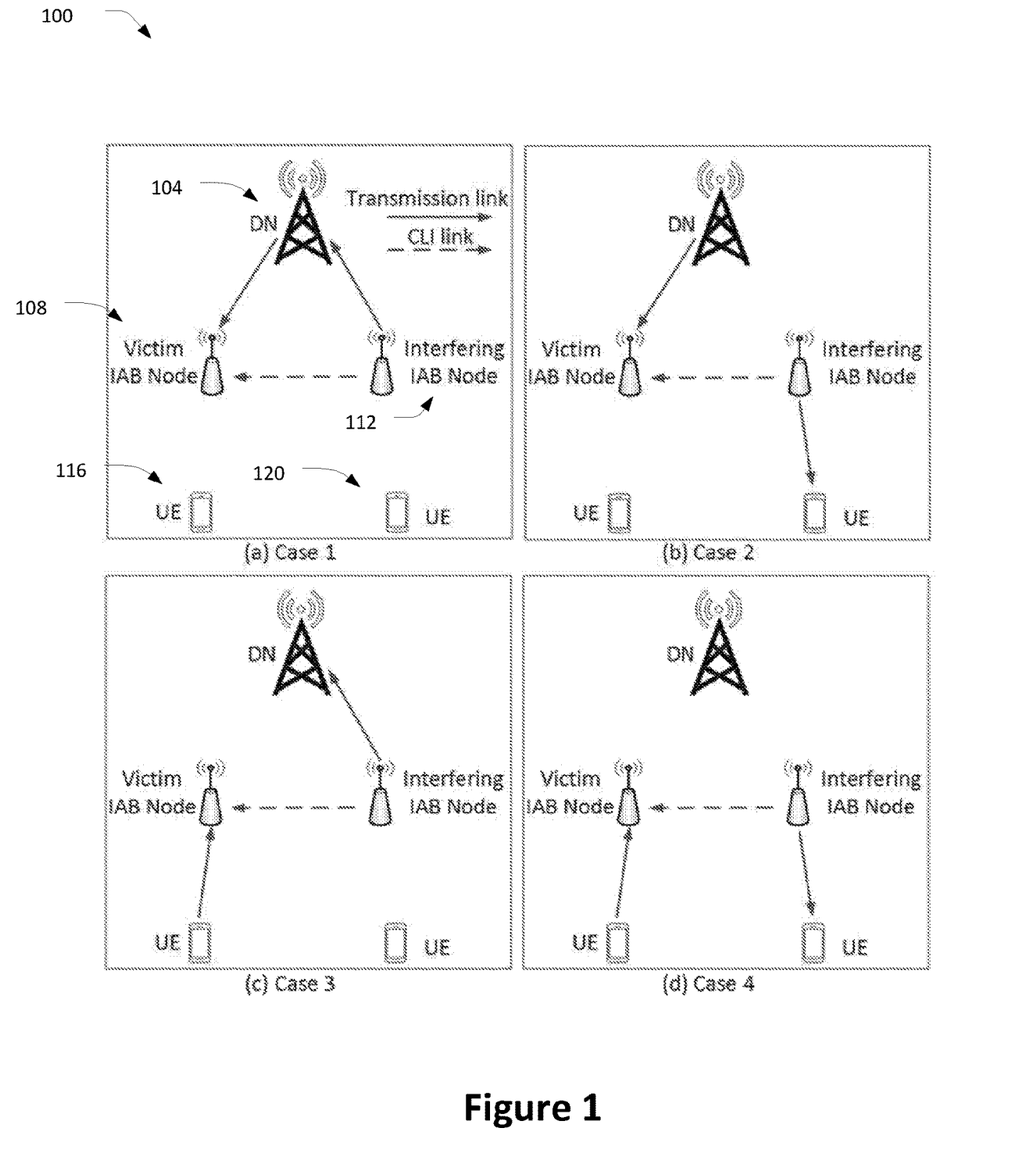
FIG. 1 illustrates four scenarios within an IAB network in accordance with some embodiments.

FIG. 1 illustrates an IAB network 100 in four different communication states (or "cases") in accordance with some embodiments. The IAB network 100 may include a IAB donor node (DN) 104, a victim IAB node 108, and interfering IAB node 112, and UEs 116 and 120. FIG. 1 only shows the reference numerals with respect to case 1; however, similar associations may also apply to cases 2-4. The solid line arrows may indicate transmission links among the different devices, while the dashed line arrows may indicate cross-link interference (CLI) link.

The DN 104 may be the radio access network (RAN) node that provides access to a core network. The DN 104 may communicate with the core network over a fiber backhaul link, or some other connection technology. The DN 104 may provide a wireless access link to one or more UEs and may further provide one or more wireless backhaul links to relay IAB nodes, for example, victim IAB node 108 and interfering IAB node 112. In some embodiments, the DN 104 may include a central unit (CU) to configure or schedule operations within the IAB network 100

In the IAB network 100, the IAB nodes may transmit at the same time over various backhaul/access links. This may result in the wireless backhaul/access links experiencing inter-IAB-node CLI. The victim IAB node 108 may, for purposes of this discussion, be the IAB node that suffers from CLI sourced from the interfering IAB node 112. The "victim" and "interfering" adjectives are simply a matter of perspective for the present discussion and depend only on the point of analysis.

FIG. 1 part (a) shows case 1, in which victim IAB node 108 receives a downlink (DL) transmission in the backhaul link, interfering IAB node 112 transmits uplink (UL) transmission in the backhaul link.

FIG. 1 part (b) shows case 2 where the victim IAB node 108 receives a DL transmission in the backhaul link, interfering IAB node 112 transmits a DL transmission in the access link.

FIG. 1 part (c) shows case 3 where the victim IAB node 108 receives an UL transmission in the access link, interfering IAB node 112 transmits UL transmission in the backhaul link.

FIG. 1 part (d) shows case 2 where the victim IAB node 108 receives an UL transmission in the access link, interfering IAB node 112 transmits a DL transmission in the access link.

To address the CLI, one way is to let each IAB node take measurements of the interference level from its surrounding IAB nodes and report the measurements to the CU in the DN 104 for proper coordination among the IAB nodes to mitigate CLI. The present disclosure provides three inter-IAB nodes CLI measurement and reporting mechanisms at an IAB node, which will be described as the victim IAB node 108 in the present description.

Mechanism 1: RSRP Measurements Over Data Channels and Aggregate Reporting

In this mechanism, the IAB node who is receiving data (either from IAB DN DL transmission or its child node (for example, a UE) UL transmission) will conduct channel measurements and report to a DN. For example, the victim IAB node 108 may be receiving data in DL transmission from DN 104 or in UL transmission from UE 116. The channel measurements may include Reference Signal Received Power (RSRP), Reference Signal Received Quality (RSRQ), or Signal to Interference plus Noise Ratio (SINR) measurements.

In embodiments, the IAB node can conduct the channel measurements based on reference signals (RSs) from its serving parent node and report results of the measurements to a CU in an IAB DN. The reference signals may be synchronization signals (SS), which may result in the corresponding measurements being SS-RSRP/SS-RSRQ/SS-SINR parameters. Additionally or alternatively the reference signals may be channel state information reference signals (CSI-RSs), which may result in the corresponding measurements being CSI-RSRP/CSI-RSRQ/CSI-SINR parameters.

In some embodiments, the victim IAB node 108 may transmit the measurement results (for example, RSRP/RSRP/SINR parameters) to the CU in the DN 104 through RRC signaling. This reporting mechanism will imply the overall CLI level without differentiating other IAB node's DL transmission or UL transmission that causes the CLI interference. It also may not differentiate the specific IAB node of the CLI interference.

For basic measurements and reporting mechanism, if the reporting values deteriorate, the CU may not differentiate whether it is because of channel condition or CLI interference. Hence, the corresponding next step actions of IAB CU may not be to the point to address the CLI issue Mechanism 2: Measurements Based on DL/UL Reference Signals of Interfering IAB Nodes and Aggregated Reporting In this mechanism, each IAB node may measure the interference level of reference signals from its surrounding IAB nodes with knowledge of the transmission directions of the surrounding IAB nodes. For example, the victim IAB node 108 may receive configuration information, from DN 104, for example, that enables it to identify UL reference signals (e.g., from interfering IAB node 112 to DN 104 in the backhaul link) and DL reference signals (e.g., from interfering IAB node 112 to UE 120 in the access link). The victim IAB node 108 may aggregate measurements of the interference levels from all neighboring IAB nodes and report aggregated CLI levels to the DN 104. A neighbor IAB node may be defined with respect to a particular IAB relay node as an IAB node that is in proximity with the IAB relay node. The proximity may be predetermined based on geographical distance or CLI potential.

In some embodiments, if the interfering IAB node 112 is transmitting data in DL in the access link, the victim IAB node 108 may base the measurement on CSI-RS or demodulation reference signal (DMRS) from the interfering IAB node 112.

The victim IAB node 108 may receive, via RRC or other higher-layer signaling, configuration information that lists CSI-RS or DMRS configuration information for the best N neighboring cells (N may also be configured). These N neighboring cells may be the IAB nodes that will most likely cause the cross-link interference.

In some embodiments, if the interfering IAB node 112 is transmitting data in UL in the backhaul link, the victim IAB node 108 may base the measurement on sounding reference signal (SRS) from that interfering IAB node 112.

The victim IAB node 108 may receive, via RRC or other higher-layer signaling, configuration information that lists SRS configuration information for the best N neighboring cells. This may be similar to that described above with respect to CSI-RS/DMRS configuration information.

After the victim IAB node 108 performs the measurements on UL/DL reference signals transmitted by interfering IAB nodes (e.g., IAB node 112), the victim IAB node 108 may report on an aggregated CLI interference level from all neighboring IAB nodes. The report may not specify CLI interference level from each interfering IAB node to save the reporting overhead. RRC signaling/parameters to support this report are provided below.

In some embodiments, the victim IAB node 108 may generate the report as an RRC message, MeasurementReport, with a measurement results (MeasResults) information element (IE) that includes the measured results. An example of the MeasResults IE is shown below.

```
MeasResults ::=                        SEQUENCE {
    measId                             MeasId,
    measResultServingMOList            MeasResultServMOList,
    measResultNeighCells               CHOICE {
        measResultListNR               MeasResultListNR,
        ... }                          OPTIONAL,
    measResultCLI-agg                  MeasQuatityResults,    OPTIONAL,
...}
MeasQuantityResults ::=                SEQUENCE {
    rsrp                               RSRP-Range
    OPTIONAL,
    rsrq                               RSRQ-Range
    OPTIONAL,
    sinr                               SINR-Range
    OPTIONAL
}
```

The MeasResults IE may include a measurement identity (measID) to identify the report; and measurement results for serving cell (measResultServingMOlist), neighboring cells (measResultNeighCells), and aggregated CLI (measResult-CLI-agg). The aggregated CLI results may correspond to the aggregated CLI interference level from all neighboring IAB nodes and may re-use the MeasQuantityResults IE in 3GPP Technical Specification (TS) 38.331, v15.2.1 (2018 Jun. 21).

Mechanism 3: Measurements Based on Interfering IAB Nodes' Reference Signals and Reporting Each IAB Node Specifically In this mechanism, the configuration and bases of the measurements may be the same as mechanism 2. For example, each IAB node may measure an interference level based on reference signals from its neighboring IAB nodes: CSI-RS or DMRS if the interfering IAB node DL transmission and SRS if the interfering IAB node UL transmission. After that, the measuring IAB nodes may report CLI interference level from each interfering IAB node specifically for the CU to coordinate.

Some embodiments may utilize RRC signaling for reporting of the inter-IAB node CLI measurement results. The RRC signaling may include a measurement results (MeasResults) IE as follows.

```
MeasResults ::=              SEQUENCE {
    measId                      MeasId,
    measResultServingMOList     MeasResultServMOList,
    measResultNeighCells        CHOICE {
        measResultListNR            MeasResultListNR,
        ... }                   OPTIONAL,
    measResultCLI-agg           MeasQuatityResults,   OPTIONAL,
    measResultCLI-list          MeasResultCLI-list,   OPTIONAL,
```

-continued

```
...}
MeasResultCLI-list ::=  SEQUENCE (SIZE (1..maxCLIReport)) OF
MeasResultCLI
MeasResultCLI ::=           SEQUENCE {
    IAB-NodeId                  PhysCellId,              OPTIONAL,
    resultsCLI                  MeasQuantityResults,     OPTIONAL,
    resultsCLI-direction        INTEGER(0,1),
OPTIONAL,
...
}
MeasQuantityResults ::=     SEQUENCE {
    rsrp                        RSRP-Range
OPTIONAL,
    rsrq                        RSRQ-Range
OPTIONAL,
    sinr                        SINR-Range
OPTIONAL
}
```

The parameters of the measurement results IE that support embodiments are as follows.

In some embodiments, a measurement results CLI list (measResultCLI-list) field may include values corresponding to CLI interference levels from multiple interfering IAB nodes.

In some embodiments, a measurement results CLI list (measResultCLI-list) IE may include the highest interfering IAB nodes up to an integer number (M), which may be a parameter indicated by a maximum CLI report (maxCLI-Report) field.

In some embodiments, a measurement results CLI list (measResultCLI-list) IE may include CLI measurement reports from each interfering IAB node. This IE may include an IAB node identifier (IAB-NodeID) field that includes an interfering IAB node identifier; a results (resultsCLI) field an indication of the CLI interference level associated with this interfering IAB node; and a CLI direction (resultsCLI-direction) field to indicate a transmission direction of the interfering IAB node (for example, a '0' may indicate DL and a '1' may indicate UL).

Table 1, below, provides a comparison of the three mechanisms discussed above in accordance with some embodiments

TABLE 1

|  | Mechanism 1 | Mechanism 2 | Mechanism 3 |
| --- | --- | --- | --- |
| Signal to be measured | Reference signal from its parent node: SS or CSI-RS | Reference Signal from interfering IAB nodes: Interfering IAB node transmitting in DL: DMRS or CSI-RS; Interfering IAB node transmitting in UL: SRS | Reference Signal from interfering IAB nodes: Interfering IAB node transmitting in DL: DMRS or CSI-RS; Interfering IAB node transmitting in UL: SRS |
| Reporting Contents to CU | SS-RSRP/SS-RSRQ/SS-SINR; and/or CSI-RSRP/CSI-RSRQ/CSI-SINR; | Aggregated interference level from all neighboring IAB nodes | CLI interference level from each interfering IAB node specifically |
| Reporting level of details | Low | Medium | High |
| Specification Impact | No impact | New RRC signaling/parameters | New RRC signaling/parameters |

Figure 2:
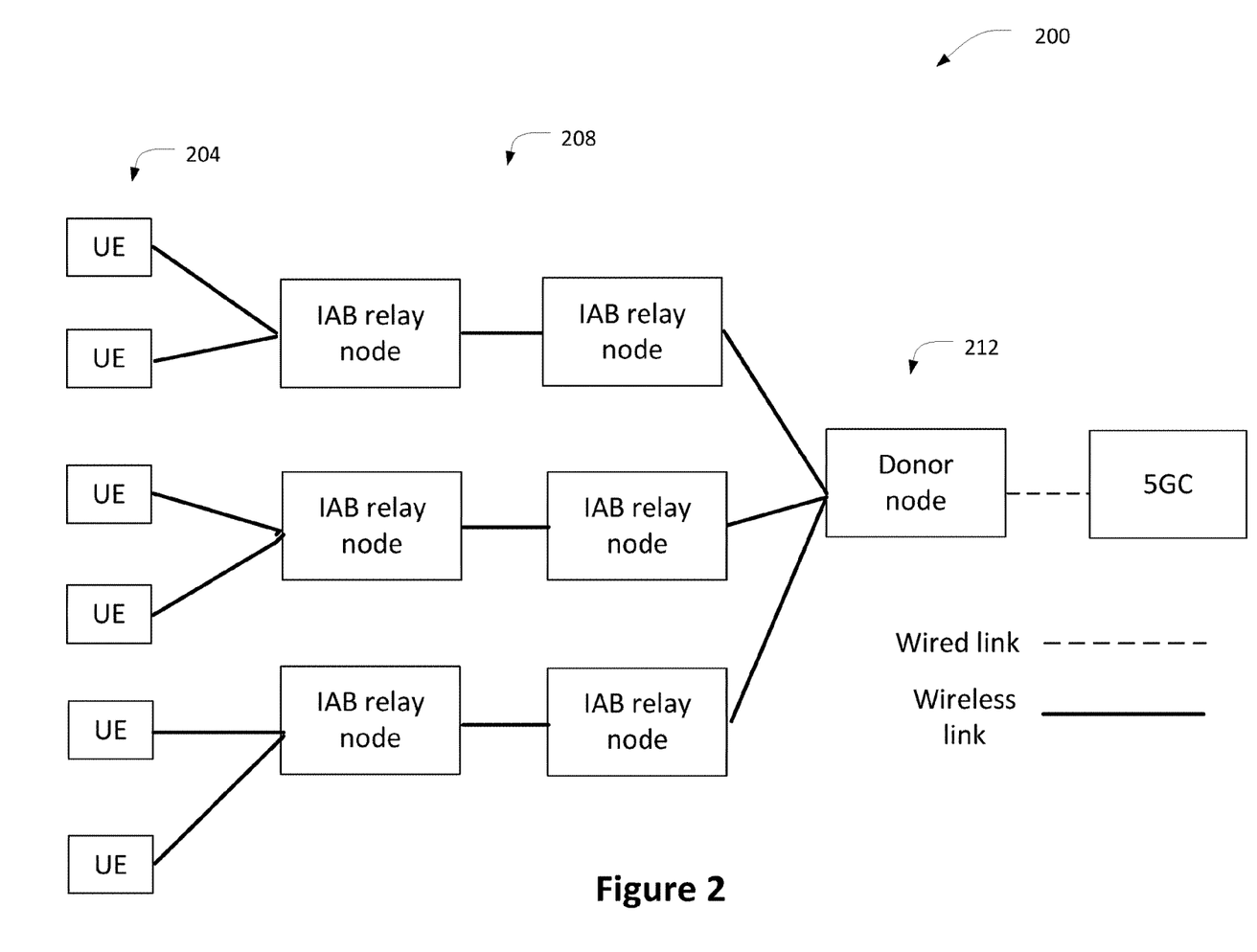
FIG. 2 illustrates an example IAB architecture in accordance with some embodiments.

FIG. 2 shows an example IAB architecture 200 in accordance with various embodiments. In FIG. 2, UEs 204 (e.g., UEs 116 or 120 in FIG. 1 discussed infra) access various IAB relay nodes (RNs) 208. The IAB RNs 208 may be similar to, and substantially interchangeable with, victim IAB node 108 or interfering IAB node 112 of FIG. 1. As shown by FIG. 2, some IAB RNs 208 access other IAB RNs 208, and some IAB RNs 208 access a donor node (DN) 212, which may be similar to, and substantially interchangeable with, DN 104. The DN 212 (or IAB donor, IAB donor node, or anchor node) is a network node in an IAB deployment that terminates NG interfaces via wired connection(s). The DN 212 is a RAN node that provides a UE's interface to a 5th Generation Core Network (5GC) 216 and wireless backhauling functionality to IAB relay nodes.

In embodiments, the IAB system architecture 200 supports multi-hop backhauling. IAB multi-hop backhauling provides more range extension than single hopping systems. Multi-hop backhauling further enables backhauling around obstacles (e.g., buildings in urban environment for in-clutter deployments). The maximum number of hops in a deployment depends on many factors such as frequency, cell density, propagation environment, traffic load, various KPIs, KQIs, and/or other like factors. From the architecture perspective, flexibility in hop count is desirable, and therefore, the IAB system may not impose limits on the number of backhaul hops.

The IAB system architecture 200 also supports topology adaptation. Topology adaptation refers to procedures that autonomously reconfigure the backhaul network under circumstances, such as blockage or local congestion without discontinuing services for UEs and/or to mitigate service disruption for UEs. For example, wireless backhaul links may be vulnerable to blockage due to moving objects such as vehicles, weather-related events (e.g., seasonal changes (foliage)), infrastructure changes (e.g., new buildings), and/or the like. These vulnerabilities may apply to physically stationary IAB-nodes and/or mobile IAB-nodes. Also, traffic variations can create uneven load distribution on wireless backhaul links leading to local link or node congestion.

In embodiments where multi-hop and topology adaptation are supported, the IAB relay nodes include topology management mechanisms and route selection and optimization (RSO) mechanisms. Topology management mechanisms include protocol stacks, interfaces between IAB nodes, control and user plane procedures for identifying one or more hops in the IAB network, forwarding traffic via one or multiple wireless backhaul links in the IAB network, handling of QoS, and the like. The RSO mechanisms include mechanisms for discovery and management of backhaul links; RAN-based mechanisms to support dynamic route selection (potentially without core network involvement) to accommodate short-term blocking and transmission of latency-sensitive traffic across backhaul links; and mechanisms for evaluating different resource allocations/routes across multiple nodes for end-to-end RSO.

Any of the IAB relay nodes 208 and DN 212 may be configured to operate in accordance with various embodiments of this disclosure. For example, the DN 212 may provide any of the IAB relay nodes 208 with RS configuration information that the IAB relay nodes 208 may use to perform measurements and reporting is described herein.

Figure 3:
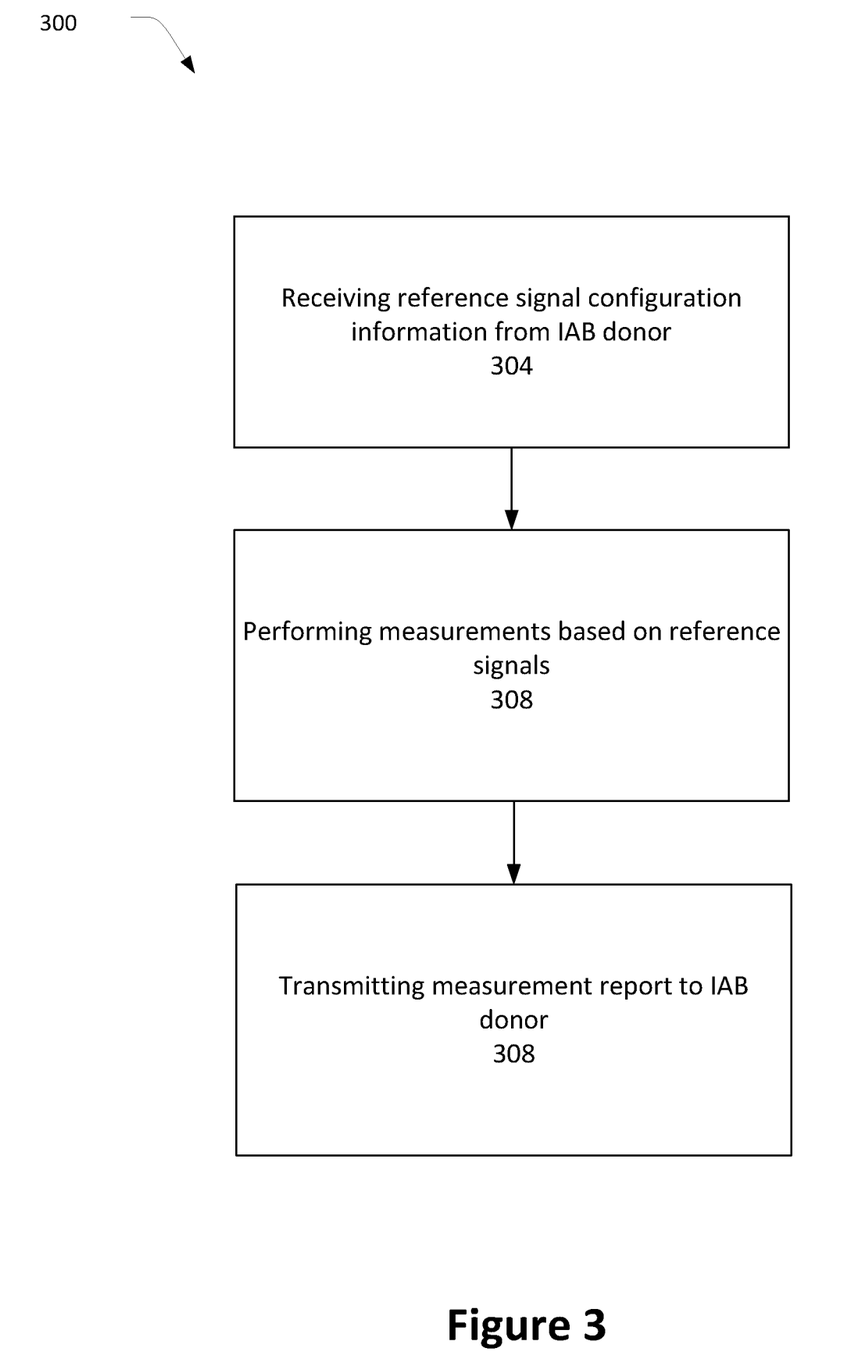
FIG. 3 illustrates an example operation flow/algorithmic structure in accordance with some embodiments.

FIG. 3 illustrates an operation flow/algorithmic structure 300 in accordance with some embodiments. An IAB node may perform the operation flow/algorithmic structure 300. For example, in some embodiments, the victim IAB node 108 or any of the relay nodes 208 (or components thereof) may perform the operation flow/algorithmic structure 300.

The operation flow/algorithmic structure 300 may include, at 304, receiving reference signal configuration information from an IAB donor. The configuration information may be received through RRC signaling or another higher-layer signaling. The signaling may occur upon an initial connection or a reconfiguration of an existing connection.

The reference signal configuration information may provide information related to synchronization signals, CSI-RS signals, or DMRS signals. These reference signals may be transmitted from IAB donor/relay nodes.

In some embodiments, the configuration information may be specific to a particular IAB node and include information about reference signals transmitted by neighboring IAB nodes. In other embodiments, the configuration information may be more generic.

The operation flow/algorithmic structure 300 may further include, at 308, performing measurements based on the reference signals. In some embodiments, the measurements may include RSRP, RSRQ, or SINR measurements based on the underlying reference signals.

The operation flow/algorithmic structure 300 may further include, at 312, transmitting a measurement report to a donor node. In some embodiments, the measurement report may be transmitted to a central unit within a donor node (or disposed elsewhere).

In various embodiments, the measurement report may include general reference signal measurements, aggregated cross-link interference levels, or cross-link interference level specific to particular IABs. In addition to including the measurement results, the measurement report may include additional information such as, but not limited to, transmission direction, IAB node identifiers, etc. in various embodiments, the measurement report may include any of the information elements, parameters, or fields described above with respect to the RRC measurement results information elements.

Figure 4:
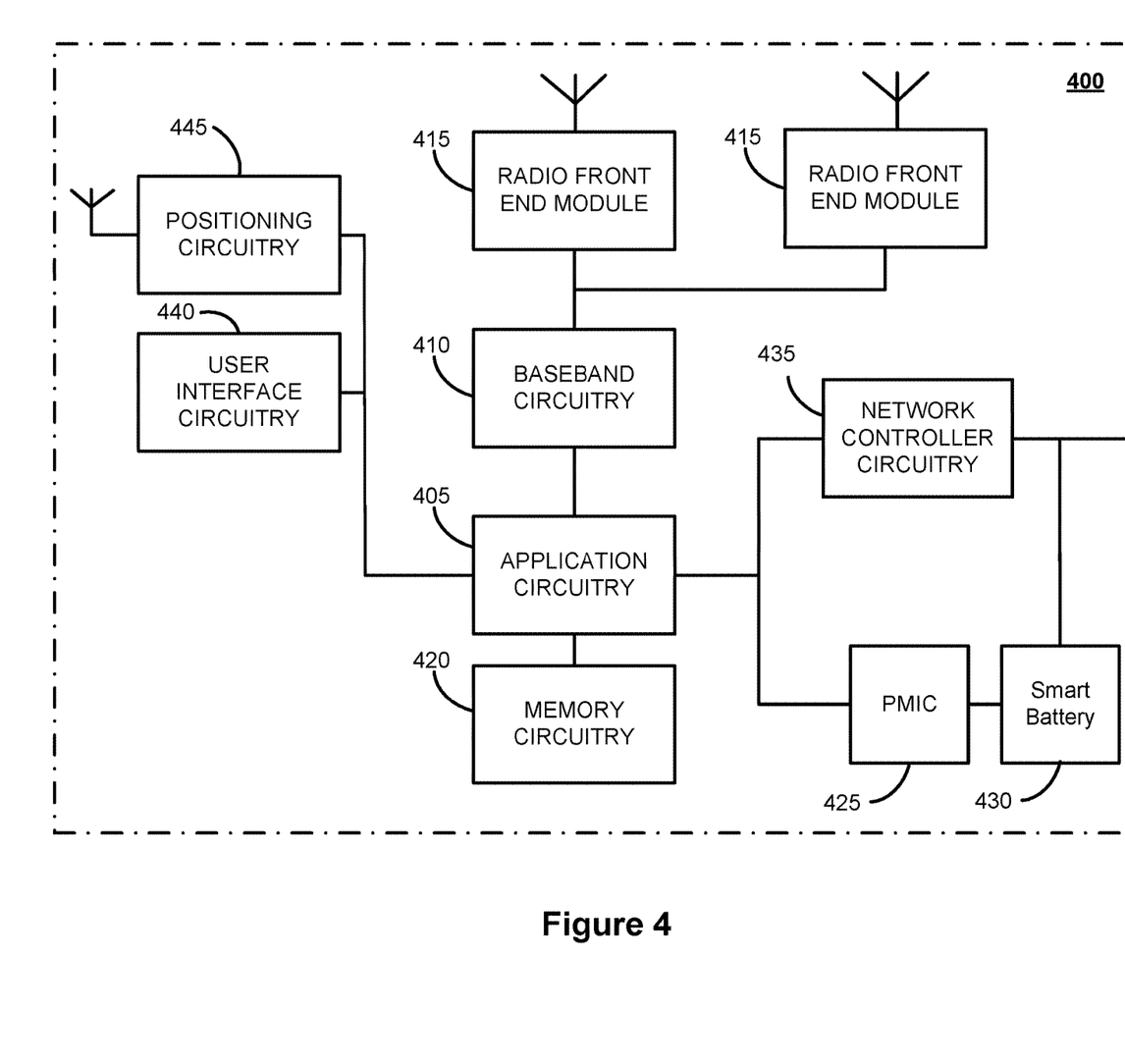
FIG. 4 illustrates an infrastructure device in accordance with some embodiments.

FIG. 4 illustrates an example of infrastructure equipment 400 in accordance with various embodiments. The infrastructure equipment 400 (or "system 400") may be implemented as a donor node (for example, DN 104 or DN 212) or an IAB relay node (for example, victim IAB node 108 or IAB relay node 208) shown and described previously. The system 400 may include one or more of application circuitry 405, baseband circuitry 410, one or more radio front end modules 415, memory circuitry 420, power management integrated circuitry (PMIC) 425, power tee circuitry 430, network controller circuitry 435, network interface connector 440, satellite positioning circuitry 445, and user interface 450. In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for CRAN, vBBU, or other like implementations).

The term "circuitry" may refer to, be a part of, or include hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as, "processor circuitry." As used herein, the term "processor circuitry" may refer to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 405 may include one or more central processing unit (CPU) cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 405 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 400 may not utilize application circuitry 405, and instead may include a special-purpose processor/controller to process IP data received from an EPC or 5GC, for example.

Additionally or alternatively, application circuitry 405 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 405 may comprise logic blocks or logic fabric, and other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. Although not shown, baseband circuitry 410 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 410 may include protocol processing circuitry with one or more instances of control circuitry (not shown) to provide control functions for the digital baseband circuitry and/or radio frequency circuitry (e.g., the radio front end modules 415).

User interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 415 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 415. The RFEMs 415 may incorporate both millimeter wave antennas and sub-millimeter wave antennas.

The memory circuitry 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 420 may be implemented as one or more of solder down packaged integrated circuits, socketed memory modules and plug-in memory cards.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 440 using a physical connection, which may be electrical (commonly referred to as a "copper interconnect"), optical, or wireless. The network controller circuitry 435 may include one or more dedicated processors and/or FPGAs to communicate using one or more of the aforementioned protocols. In some implementations, the network controller circuitry 435 may include multiple controllers to provide connectivity to other networks using the same or different protocols.

The positioning circuitry 445 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 445 may comprise various hardware elements (e.g., including hardware devices such as switches, filters, amplifiers, antenna elements, and the like to facilitate OTA communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 445 and/or positioning circuitry implemented by UEs XQ01, XQ02, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 445 may include a Micro-Technology for Positioning, Navigation, and Timing (Micro-PNT) integrated circuit (IC) that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry 445 may provide data to application circuitry 405 that may include one or more of position data or time data. Application circuitry 405 may use the time data to synchronize operations with other radio base stations (e.g., RAN nodes XQ11 or the like).

The components shown by FIG. 4 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I2C interface, an SPI interface, point to point interfaces, and a power bus, among others.

Figure 5:
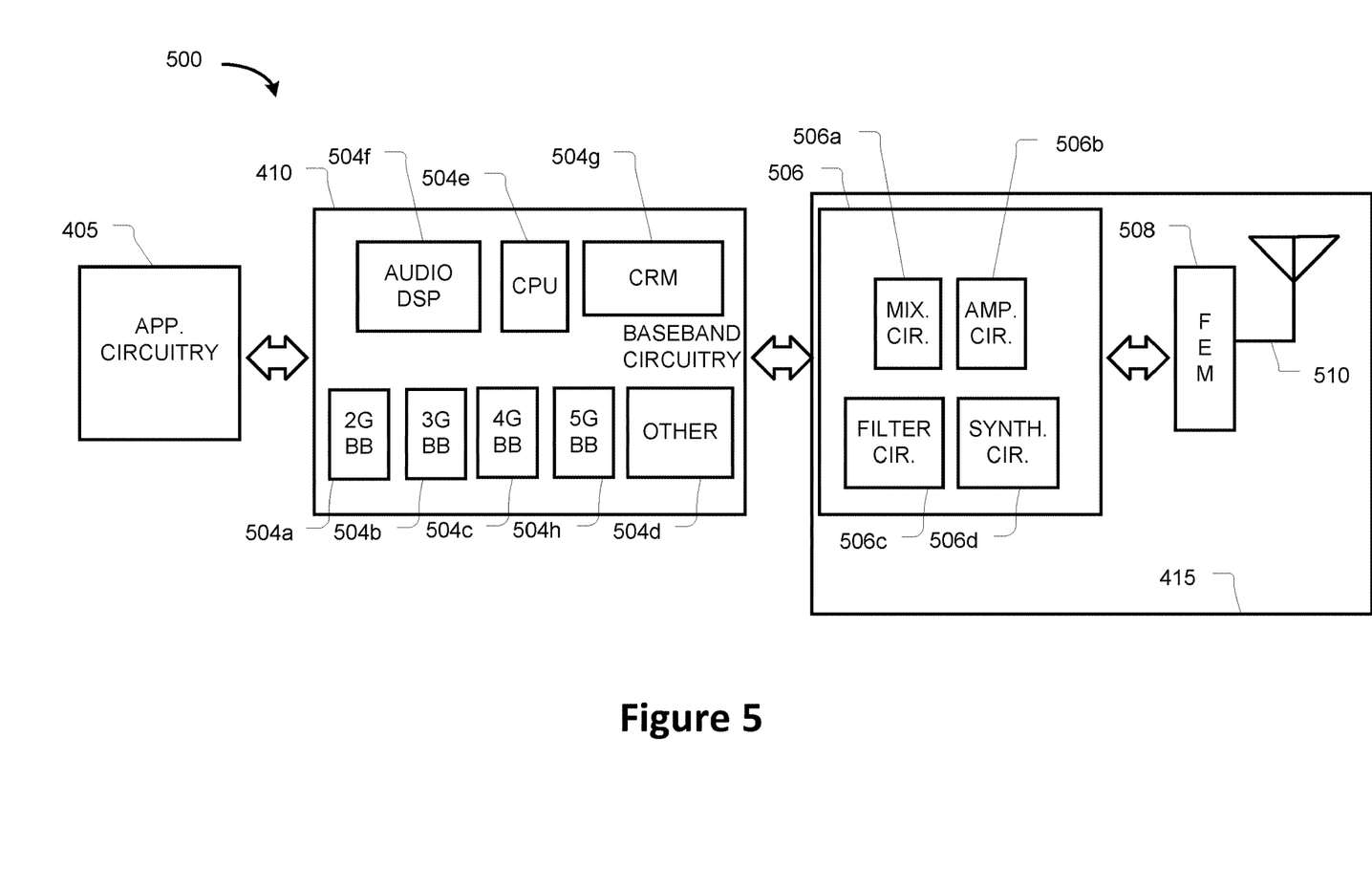
FIG. 5 illustrates example components of a device in accordance with some embodiments.

FIG. 5 illustrates example components of baseband circuitry 410 and radio front end modules (RFEM) 415 in accordance with various embodiments. As shown, the RFEMs 415 may include Radio Frequency (RF) circuitry 506, front-end module (FEM) circuitry 508, one or more antennas 511 coupled together at least as shown.

The baseband circuitry 410 may include circuitry such as, but not limited to, one or more single-core or multi-core processors. The baseband circuitry 410 may include one or more baseband processors or control logic to process baseband signals received from a receive signal path of the RF circuitry 506 and to generate baseband signals for a transmit signal path of the RF circuitry 506. Baseband processing circuitry 410 may interface with the application circuitry 405 for generation and processing of the baseband signals and for controlling operations of the RF circuitry 506. For example, in some embodiments, the baseband circuitry 410 may include a third generation (3G) baseband processor 504A, a 4G baseband processor 504B, a 5G baseband processor 504C, or other baseband processor(s) 504D for other existing generations, generations in development or to be developed in the future (e.g., second generation (2G), sixth generation (6G), etc.). The baseband circuitry 410 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 410 may include Fast-Fourier Transform (FFT), precoding, or constellation mapping/demapping functionality. In some embodiments, encoding/decoding circuitry of the baseband circuitry 410 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 410 may include one or more audio digital signal processor(s) (DSP) 504F. The audio DSP(s) 504F may include elements for compression/decompression and echo cancellation and may include other suitable processing elements in other embodiments. Components of the baseband circuitry may be suitably combined in a single chip or a single chipset, or disposed on a same circuit board in some embodiments. In some embodiments, some or all of the constituent components of the baseband circuitry 410 and the application circuitry 405 may be implemented together such as, for example, on a system on a chip (SOC).

In some embodiments, the baseband circuitry 410 may provide for communication compatible with one or more radio technologies. For example, in some embodiments, the baseband circuitry 410 may support communication with an E-UTRAN or other WMAN, a WLAN, a WPAN. Embodiments in which the baseband circuitry 410 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path, which may include circuitry to down-convert RF signals received from the FEM circuitry 508 and provide baseband signals to the baseband circuitry 410. RF circuitry 506 may also include a transmit signal path, which may include circuitry to up-convert baseband signals provided by the baseband circuitry 410 and provide RF output signals to the FEM circuitry 508 for transmission.

In some embodiments, the receive signal path of the RF circuitry 506 may include mixer circuitry 506*a*, amplifier circuitry 506*b* and filter circuitry 506*c*. In some embodiments, the transmit signal path of the RF circuitry 506 may include filter circuitry 506*c* and mixer circuitry 506*a*. RF circuitry 506 may also include synthesizer circuitry 506*d* for synthesizing a frequency for use by the mixer circuitry 506*a* of the receive signal path and the transmit signal path. In some embodiments, the mixer circuitry 506*a* of the receive signal path may be configured to down-convert RF signals received from the FEM circuitry 508 based on the synthesized frequency provided by synthesizer circuitry 506*d*. The amplifier circuitry 506*b* may be configured to amplify the down-converted signals and the filter circuitry 506*c* may be a low-pass filter (LPF) or band-pass filter (BPF) configured to remove unwanted signals from the down-converted signals to generate output baseband signals. Output baseband signals may be provided to the baseband circuitry 410 for further processing. In some embodiments, the output baseband signals may be zero-frequency baseband signals, although this is not a requirement. In some embodiments, mixer circuitry 506*a* of the receive signal path may comprise passive mixers, although the scope of the embodiments is not limited in this respect.

In some embodiments, the mixer circuitry 506*a* of the transmit signal path may be configured to up-convert input baseband signals based on the synthesized frequency provided by the synthesizer circuitry 506*d* to generate RF output signals for the FEM circuitry 508. The baseband signals may be provided by the baseband circuitry 410 and may be filtered by filter circuitry 506*c*.

In some embodiments, the mixer circuitry 506*a* of the receive signal path and the mixer circuitry 506*a* of the transmit signal path may include two or more mixers and may be arranged for quadrature downconversion and upconversion, respectively. In some embodiments, the mixer circuitry 506*a* of the receive signal path and the mixer circuitry 506*a* of the transmit signal path may include two or more mixers and may be arranged for image rejection (e.g., Hartley image rejection). In some embodiments, the mixer circuitry 506*a* of the receive signal path and the mixer circuitry 506*a* of the transmit signal path may be arranged for direct downconversion and direct upconversion, respectively. In some embodiments, the mixer circuitry 506*a* of the receive signal path and the mixer circuitry 506*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 410 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506*d* may be a fractional-N synthesizer or a fractional N/N+1 synthesizer, although the scope of the embodiments is not limited in this respect as other types of frequency synthesizers may be suitable. For example, synthesizer circuitry 506*d* may be a delta-sigma synthesizer, a frequency multiplier, or a synthesizer comprising a phase-locked loop with a frequency divider.

The synthesizer circuitry 506*d* may be configured to synthesize an output frequency for use by the mixer circuitry 506*a* of the RF circuitry 506 based on a frequency input and a divider control input. In some embodiments, the synthesizer circuitry 506*d* may be a fractional N/N+1 synthesizer.

In some embodiments, frequency input may be provided by a voltage controlled oscillator (VCO), although that is not a requirement. Divider control input may be provided by either the baseband circuitry 410 or the application circuitry 405 depending on the desired output frequency. In some embodiments, a divider control input (e.g., N) may be determined from a look-up table based on a channel indicated by the application circuitry 405.

Synthesizer circuitry 506*d* of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path, which may include circuitry configured to operate on RF signals received from one or more antennas 511, amplify the received signals and provide the amplified versions of the received signals to the RF circuitry 506 for further processing. FEM circuitry 508 may also include a transmit signal path, which may include circuitry configured to amplify signals for transmission provided by the RF circuitry 506 for transmission by one or more of the one or more antennas 511.

In various embodiments, the amplification through the transmit or receive signal paths may be done solely in the RF circuitry 506, solely in the FEM circuitry 508, or in both the RF circuitry 506 and the FEM circuitry 508.

In some embodiments, the FEM circuitry 508 may include a TX/RX switch to switch between transmit mode and receive mode operation. The FEM circuitry 508 may include a receive signal path and a transmit signal path. The receive signal path of the FEM circuitry 508 may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 511).

Processors of the application circuitry 405 and processors of the baseband circuitry 410 may be used to execute elements of one or more instances of a protocol stack. For example, processors of the baseband circuitry 410, alone or in combination, may be used execute Layer 3, Layer 2, or Layer 1 functionality, while processors of the application circuitry 405 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 6:
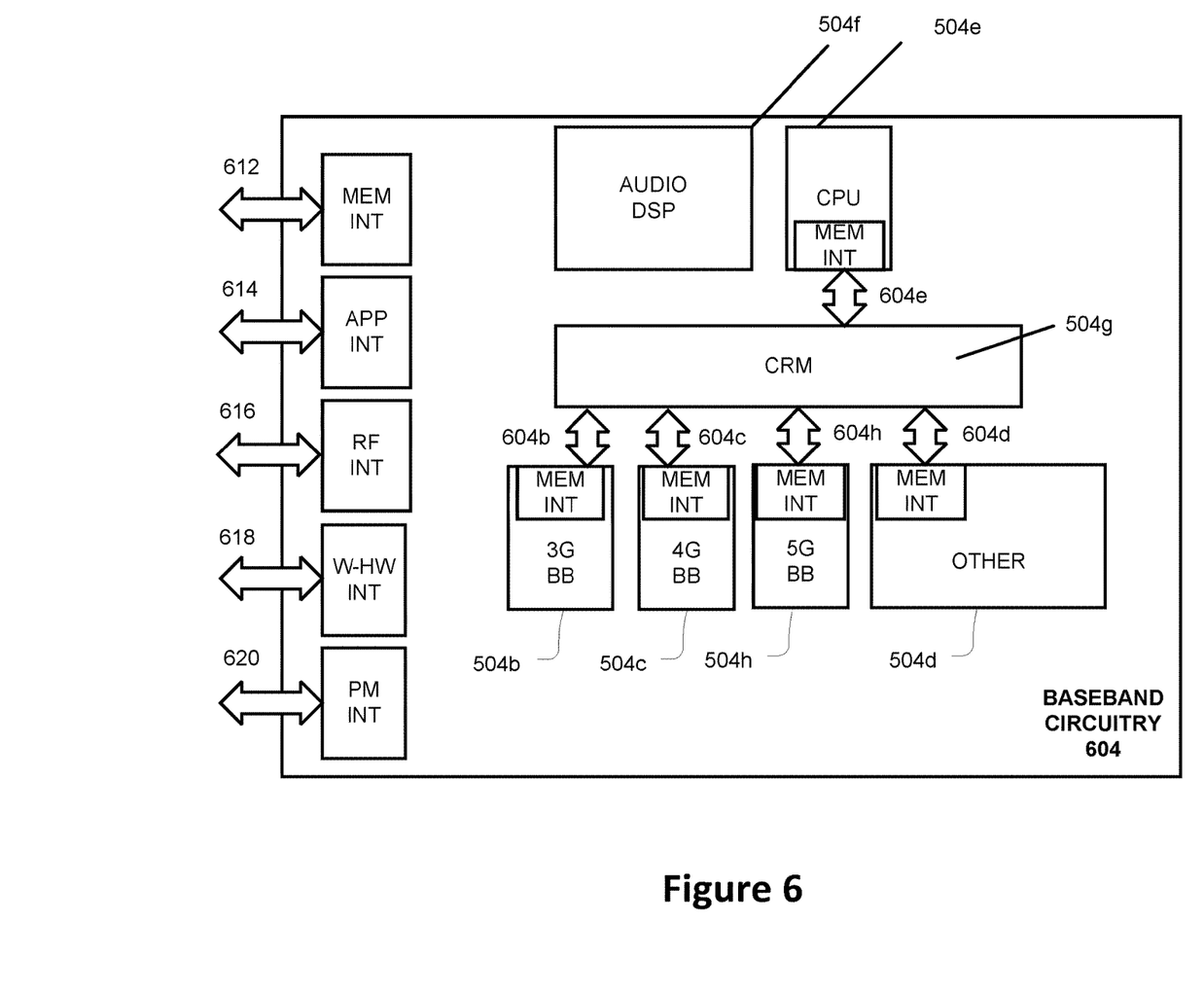
FIG. 6 illustrates interfaces of baseband circuitry in accordance with some embodiments.

FIG. 6 illustrates example interfaces of baseband circuitry in accordance with various embodiments. As discussed above, the baseband circuitry 410 of FIGS. 4 and 5 may comprise processors 504A-504E and a memory 504G utilized by said processors. Each of the processors 504A-504E may include a memory interface, 604A-604E, respectively, to send/receive data to/from the memory 504G.

The baseband circuitry 410 may further include one or more interfaces to communicatively couple to other circuitries/devices, such as a memory interface 612 (e.g., an interface to send/receive data to/from memory external to the baseband circuitry 410), an application circuitry interface 614 (e.g., an interface to send/receive data to/from the application circuitry 405 of FIG. 4), an RF circuitry interface 616 (e.g., an interface to send/receive data to/from RF circuitry 506), a wireless hardware connectivity interface 618 (e.g., an interface to send/receive data to/from Near Field Communication (NFC) components, Bluetooth® components (e.g., Bluetooth® Low Energy), Wi-Fi® components, and other communication components), and a power management interface 620 (e.g., an interface to send/receive power or control signals to/from the PMIC 425.

Figure 7:
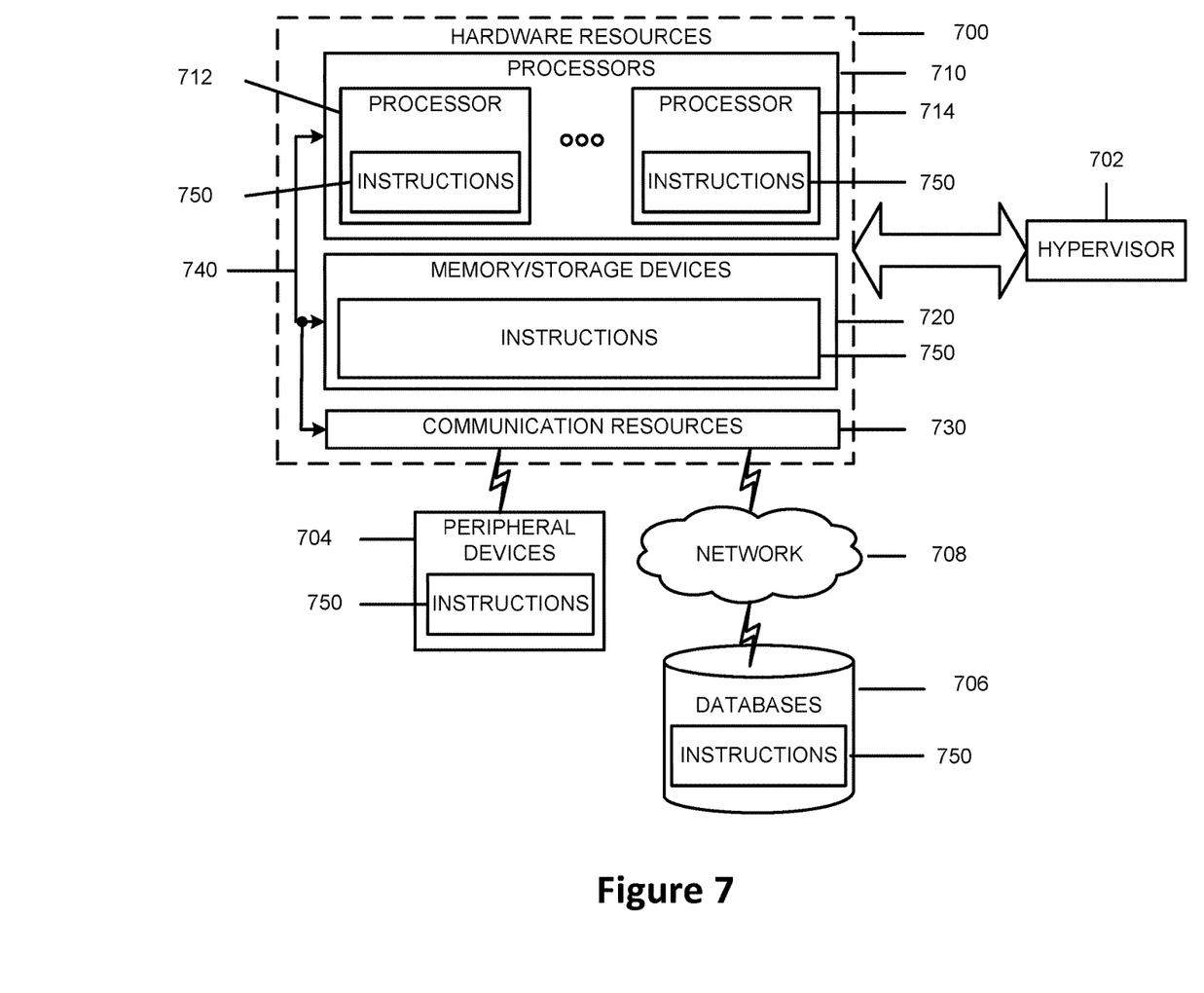
FIG. 7 illustrates components of an electronic device in accordance with some embodiments.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. As used herein, the term "computing resource," "hardware resource," etc., may refer to a physical or virtual device, a physical or virtual component within a computing environment, and/or a physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 702 may be executed to provide an execution environment for one or more network slices/sub-slices to utilize the hardware resources 700. A "virtualized resource" may refer to compute, storage, and/or network resources provided by virtualization infrastructure to an application, device, system, etc.

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via a universal serial bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Some non-limiting examples are provided below.

Example 1 includes a method comprising receiving radio resource control (RRC) signaling from a IAB donor node, the RRC signaling to include configuration information with respect to reference signals (e.g., SS, CSI-RS, or DMRS) of the IAB donor node or one or more neighboring IAB nodes; and performing one or more measurements based on the reference signals of the donor node or the one or more neighboring IAB nodes; and transmitting measurement report to the IAB donor node, the measurement report to include an indication of results of the one or more measurements.

Example 2 may include the method of example 1 or some other example herein wherein the one or more measurements includes RSRP measurement, an RSRQ measurement, or an SINR measurement.

Example 3 may include the method of example 1 or some other example herein, wherein the configuration information is with respect to reference signals of a plurality of neighboring IAB nodes and the method further comprises: generating an aggregated cross-link interference level based on the one or more measurements based on the reference signals of the plurality of neighboring IAB nodes, wherein the measurement report is to include an indication of the aggregated cross-link interference level.

Example 4 may include the method of example 3 or some other example herein, wherein the measurement report is an RRC message that includes a measurement results information element with the indication of the aggregated cross-link interference level.

Example 5 may include the method of example 1 or some other example herein, wherein the configuration information is with respect to reference signals of a plurality of neighboring IAB nodes and the method further comprises: generating a plurality of cross-link interference levels respectively associated with the plurality of neighboring IAB nodes, where the measurement report is to include an indication of at least one of the plurality of cross-link interference levels.

Example 6 may include the method of example 5 or some other example herein, wherein the measurement report is an RRC message that includes a measurement results information element that includes: a measurement results CLI list that includes the indication of the at least one cross-link interference level.

Example 7 may include the method of example 6 or some other example herein, further comprising: identifying an integer (M) based on a maximum CLI report parameter provided by the IAB donor node, wherein the at least one cross-link interference level includes no more than M cross-link interference levels.

Example 8 may include the method of example 7 or some other example herein, further comprising: selecting, from the plurality of cross-link interference levels, the M highest cross-link interference levels as the at least one cross-link interference level to be included in the measurement report.

Example 9 may include the method of example 6 or some other example herein, wherein the measurement results CLI list includes an indication of an interfering IAB node identifier corresponding to each of the at least one cross-link interference levels.

Example 10 may include the method of example 6 or some other example herein, wherein the measurement results CLI list includes an indication of an uplink or downlink transmission direction corresponding to each of the at least one cross-link interference levels.

Example 11 may include a method comprising storing configuration information, the configuration information to provide information related to reference signals (for example, SS, CSI-RS, or DMRS) of the IAB donor node or one or more IAB nodes that are in proximity with an IAB relay node; generating a radio resource control (RRC) message to include the configuration information; and transmitting the RRC message to the IAB relay node.

Example 12 may include the method of example 11 or some other example herein, wherein the configuration information is to configure the IAB relay node to perform one or more measurements that include a reference signal received power measurement, a reference signal received quality measurements, or a signal-to-interference-plus-noise ratio measurement with respect to the reference signals.

Example 13 may include the method of example 11 or some other example herein, further comprising identifying the one or more IAB nodes that are in proximity with the IAB relay node, and generate the configuration information to include information related to reference signals of the one more IAB nodes.

Example 14 may include the method of example 11 or some other example herein, wherein the configuration information includes a maximum CLI report parameter to limit a number of cross-link interference levels reported by the IAB relay node.

The description herein of illustrated implementations, including what is described in the Abstract, is not intended to be exhaustive or to limit the present disclosure to the precise forms disclosed. While specific implementations and examples are described herein for illustrative purposes, a variety of alternate or equivalent embodiments or implementations calculated to achieve the same purposes may be made in light of the above detailed description, without departing from the scope of the present disclosure, as those skilled in the relevant art will recognize.

What is claimed is:

1. One or more non-transitory computer-readable media having instructions that, when executed by one or more processors, cause an integrated access and backhaul (IAB) node to:

receive radio resource control (RRC) signaling from an IAB donor node, the RRC signaling to include configuration information to identify a plurality of uplink (UL) reference signals between a plurality of neighboring IAB nodes and the IAB donor node and a plurality of downlink (DL) reference signals between the plurality of neighboring IAB nodes and a plurality of user equipments (UEs);

perform a plurality of measurements associated with the plurality of neighboring IAB nodes based on corresponding UL reference signals from among the plurality of UL reference signals transmitted to the IAB donor node in a UL or corresponding DL reference signals from among the plurality of DL reference signals transmitted to the plurality of UEs in a DL;

generate a measurement report based on the plurality of measurements; and transmit the measurement report to the IAB donor node, the measurement report to include an indication of results of the plurality of measurements for the plurality of neighboring IAB nodes.

2. The one or more non-transitory computer-readable media of claim 1, wherein the plurality of measurements comprises a plurality of reference signal received power measurements of the corresponding UL reference signals, a plurality of reference signal received quality measurements of the corresponding UL reference signals, a plurality of signal-to-interference-plus-noise ratio measurements of the corresponding UL reference signals, a plurality of reference signal received power measurements of the corresponding DL reference signals, a plurality of reference signal received quality measurements of the corresponding DL reference signals, or a plurality of signal-to-interference-plus-noise ratio measurements of the corresponding DL reference signals.

3. The one or more non-transitory computer-readable media of claim 1, wherein the plurality of UL reference signals comprises a plurality of UL synchronization signals, a plurality of UL channel-state information reference signals, or a plurality of UL demodulation reference signals, and
wherein the plurality of DL reference signals comprises a plurality of DL synchronization signals, a plurality of DL channel-state information reference signals, or a plurality of DL demodulation reference signals.

4. The one or more non-transitory computer-readable media of claim 1, wherein the configuration information is with respect to the plurality of UL reference signals or the plurality of DL reference signals,
wherein the instructions, when executed by the one or more processors, further cause the IAB node to:
generate an aggregated cross-link interference (CLI) level based on the plurality of measurements, and
wherein the measurement report comprises an indication of the aggregated CLI level.

5. The one or more non-transitory computer-readable media of claim 4, wherein the measurement report comprises an RRC message that includes a measurement results information element with the indication of the aggregated CLI level.

6. The one or more non-transitory computer-readable media of claim 1, wherein the configuration information is with respect to the plurality of UL reference signals or the plurality of DL reference signals,
wherein the instructions, when executed by the one or more processors, further cause the IAB node to:
generate a plurality of cross-link interference (CLI) levels respectively associated with the plurality of neighboring IAB nodes,
wherein the measurement report comprises an indication of at least one of the plurality of CLI levels.

7. The one or more non-transitory computer-readable media of claim 6, wherein the measurement report is an RRC message that comprises a measurement results information element (IE), the measurement results IE comprising a measurement results CLI list that includes the indication of the at least one of the plurality of CLI levels.

8. The one or more non-transitory computer-readable media of claim 7, wherein the instructions, when executed by the one or more processors, further cause the IAB node to:
identify an integer (M) based on a maximum CLI report parameter provided by the IAB donor node, and
wherein the at least one of the plurality of CLI levels includes no more than M CLI levels.

9. The one or more non-transitory computer-readable media of claim 8, wherein the instructions, when executed, further cause the IAB node to:
select, from the plurality of CLI levels, M highest CLI levels as the at least one of the plurality of CLI levels to be included in the measurement report.

10. The one or more non-transitory computer-readable media of claim 7, wherein the measurement results CLI list comprises an indication of an interfering IAB node identifier corresponding to each of the at least one of the plurality of CLI levels.

11. The one or more non-transitory computer-readable media of claim 7, wherein the measurement results CLI list further comprises an indication of a UL transmission direction or a DL transmission direction corresponding to each of the at least one of the plurality of CLI levels.

12. An integrated access and backhaul (IAB) donor node, comprising:
memory to store configuration information to identify a plurality of uplink (UL) reference signals between a plurality of neighboring IAB nodes and the IAB donor node and a plurality of downlink (DL) reference signals between the plurality of neighboring IAB nodes and a plurality of user equipments (UEs); and
processing circuitry, coupled with the memory, configured to:
generate a radio resource control (RRC) message to include the configuration information;
transmit the RRC message to an IAB relay node; and
receive a measurement report from the IAB relay node, the measurement report to include an indication of results of a plurality of measurements that are associated with the plurality of neighboring IAB nodes based on corresponding UL reference signals from among the plurality of UL reference signals transmitted to the IAB donor node in a UL or corresponding DL reference signals from among the plurality of DL reference signals transmitted to the plurality of UEs in a DL.

13. The IAB donor node of claim 12, wherein the plurality of measurements comprise a plurality of reference signal received power measurements of the corresponding UL reference signals, a plurality of reference signal received quality measurements of the corresponding UL reference signals, a plurality of signal-to-interference-plus-noise ratio measurements of the corresponding UL reference signals, a plurality of reference signal received power measurements of the corresponding DL reference signals, a plurality of reference signal received quality measurements of the corresponding DL reference signals, or a plurality of signal-to-interference-plus-noise ratio measurements of the corresponding DL reference signals.

14. The IAB donor node of claim 12, wherein the plurality of UL reference signals comprises a plurality of UL synchronization signals, a plurality of UL channel-state information reference signals, or a plurality of UL demodulation reference signals, and
wherein the plurality of DL reference signals comprises a plurality of DL synchronization signals, a plurality of DL channel-state information reference signals, or a plurality of DL demodulation reference signals.

15. The IAB donor node of claim 12, wherein the configuration information comprises a maximum cross-link interference (CLI) report parameter to limit a number of CLI levels reported by the IAB relay node.

16. An integrated access and backhaul (IAB) node, comprising:
interface circuitry configured to receive radio resource control (RRC) signaling from an IAB donor node, the RRC signaling to include configuration information to identify a plurality of uplink (UL) reference signals between a plurality of neighboring IAB nodes and the IAB donor node and a plurality of downlink (DL)

reference signals between the plurality of neighboring IAB nodes and a plurality of user equipments (UEs); and processing circuitry, coupled with the interface circuitry, configured to:
perform a plurality of measurements associated with the plurality of neighboring IAB nodes based on corresponding UL reference signals from among the plurality of UL reference signals transmitted to the IAB donor node in a UL or corresponding DL reference signals from among the plurality of DL reference signals transmitted to the plurality of UEs in a DL;
generate a measurement report based on the plurality of measurements; and
transmit the measurement report to the IAB donor node, the measurement report to include an indication of results of the plurality of measurements for the plurality of neighboring IAB nodes.

17. The IAB node of claim 16, wherein the configuration information is with respect to the plurality of UL reference signals or the plurality of DL reference signals,
wherein the processing circuitry is further configured to:
generate an aggregated cross-link interference (CLI) level based on the plurality of measurements, and
wherein the measurement report comprises an indication of the aggregated CLI level.

18. The IAB node of claim 16, wherein the configuration information is with respect to the plurality of UL reference signals or the plurality of DL reference signals,
wherein the processing circuitry is further configured to:
generate a plurality of cross-link interference (CLI) levels respectively associated with the plurality of neighboring IAB nodes, and
wherein the measurement report comprises an indication of at least one of the plurality of CLI levels.

19. The IAB node of claim 18, wherein the measurement report comprises an RRC message that includes a measurement results information element (IE), the measurement results IE comprising a measurement results CLI list that includes the indication of the at least one of the plurality of CLI levels.

20. The one or more non-transitory computer-readable media of claim 1, wherein the instructions, when executed by the one or more processors, further cause the IAB node to aggregate the plurality of measurements to generate the measurement report.

* * * * *